(12) United States Patent
Paszkowski

(10) Patent No.: US 6,747,065 B1
(45) Date of Patent: Jun. 8, 2004

(54) SYSTEM AND METHOD FOR PRODUCING HIGH PURITY COLLOIDAL SILICA AND POTASSIUM HYDROXIDE

(75) Inventor: Andrew Joseph Paszkowski, Kennesaw, GA (US)

(73) Assignee: Chemical Products Corporation, Cartersville, GA (US)

( * ) Notice: Subject to any disclaimer, the term of this patent is extended or adjusted under 35 U.S.C. 154(b) by 275 days.

(21) Appl. No.: 09/653,732

(22) Filed: Sep. 1, 2000

(51) Int. Cl.[7] .......................... B01D 15/00; B01F 17/00
(52) U.S. Cl. .................. 516/83; 210/670; 210/681; 210/660
(58) Field of Search ................. 210/660, 670, 210/681, 687; 516/83

(56) References Cited

U.S. PATENT DOCUMENTS

| | | | |
|---|---|---|---|
| 2,244,325 A | * | 6/1941 | Bird |
| 2,631,134 A | * | 3/1953 | Iler .............. 516/83 |
| 3,440,176 A | * | 4/1969 | Sippel |
| 3,560,400 A | * | 2/1971 | Chilton ........... 516/84 |
| 3,789,009 A | | 1/1974 | Irani |
| 3,969,266 A | * | 7/1976 | Iler .............. 516/82 |
| 4,865,744 A | * | 9/1989 | Hartling et al. ..... 210/651 |
| 4,915,870 A | * | 4/1990 | Jones ............. 516/81 |
| 5,100,581 A | * | 3/1992 | Watanabe et al. .... 106/287.34 |
| 5,230,833 A | | 7/1993 | Romberger et al. |
| 5,248,418 A | * | 9/1993 | Munch ............ 210/195.2 |
| 5,352,277 A | * | 10/1994 | Sasaki ............ 106/197.01 |
| 5,458,812 A | * | 10/1995 | Brekau et al. ...... 106/287.34 |
| 6,334,880 B1 | * | 1/2002 | Negrych et al. ..... 106/3 |

FOREIGN PATENT DOCUMENTS

WO    WO 99/01377    * 1/1999

OTHER PUBLICATIONS http://www.zaclon.com/pdf/zace200_datasheet.pdf dated Feb. 2002, downloaded on Aug. 4, 2002.*

* cited by examiner

Primary Examiner—Chester T. Barry
(74) Attorney, Agent, or Firm—Todd Deveau; Thomas, Kayden Horstemeyer & Risely LLP

(57) ABSTRACT

A system and method are disclosed for producing high purity colloidal silica by the steps of providing a quantity of potassium silicate; subjecting the quantity of potassium silicate to an ion exchange process to remove a first portion of potassium therefrom to produce a quantity of colloidal silica; and subjecting the quantity of colloidal silica to ultrafiltration to remove a portion of sodium therefrom, producing a quantity of high purity colloidal silica. High purity potassium hydroxide may also be prepared by regenerating the ion exchange resin with an acid to produce a quantity of potassium salt, which may be further purified by evaporation, crystallization, then further processed by electrodialysis and/or electrolysis.

5 Claims, 8 Drawing Sheets

FIG. 4

Summary of ED Runs ($K_2SO_4$ splitting)

| Run# | Cell/Feed Source | AvgCD / V At Peak CD mA/cm² / V | Init Feed Sulfate Molar | Final Feed Sulfate Molar | Base Current Efficiency % | Base Conc M KOH / mM SO₄ | Water Transport Into Base Mol/mol K⁺ | Acid Current Efficiency % | Acid Conc Molar | SO₄ Mass Balance % |
|---|---|---|---|---|---|---|---|---|---|---|
| 484-2 | EUR 2-C5 / Crystal | 84 / 14.4 | 0.83 | 0.33 | 84 | 2.28 / 3.8 | 2.0 | 74 | 1.0 | 99 |
| 484-6 | EUR 1-C5 / Crystal | 148 / 16.2 | 0.75 | 0.54 | 87 | 2.54 / 1.1 | 3.3 | 82 | 1.1 | 98 |
| 484-22 | ED-1 BP / Crystal | 187 / 13.5 | 0.70 | 0.485 | 84 | 2.62 / 1.1 | 3.9 | 76 | 1.35 | 103 |
| 484-27 | ED-1 BP / Crystal | 162 / 13.3 | 0.635 | 0.375 | 86 | 3.55 / 1.6 | 3.1 | 65 | 1.33 | 99 |
| 484-31 | ED-1 BP / Hi Na Soln | 48 / 20 | 0.602 | 0.527 | 82 | 1.2 / 2.1 | 3.2 | 50 | 0.67 | 96 |

FIG. 5

Summary of ED Runs (K₂SO₄ splitting)

| Run # | K:Na Mole Ratio In Feed | K:Na Mole Ratio In Base | Partition Coefficient across CMB Membrane K vs Na | Diffusion Coefficient SO₄ m²/sec | Diffusion Coefficient K Into Acid m²/sec |
|---|---|---|---|---|---|
| 484-2 | - | - | - | $6.0*10^{12}$ | $2.1*10^{12}$ |
| 484-6 | - | - | - | $1.9*10^{12}$ | $3.1*10^{12}$ |
| 484-22 | 6405:1 | 5468:1 | 0.9 | $2.3*10^{12}$ | $2.4*10^{12}$ |
| 484-27 | 8596:1 | 9561:1 | 1.1 | $2.5*10^{12}$ | $1.6*10^{12}$ |
| 484-31 | 57:1 | 45:1 | 0.8 | $2.8*10^{12}$ | $1.2*10^{12}$ |

FIG. 6

Summary of Analytical Results for ED Runs

| Run | Initial Feed [Na] / [SO$_4$] / pH mg/L / M / pH | Final Feed [Na] / [SO$_4$] / pH mg/L / M / pH | Initial Base [Na] / [OH] / [SO$_4$] mg/L / M / M | Final Base [Na] / [OH] / [SO$_4$] mg/L / M / M | Initial Acid [SO$_4$] / {K} M / mg/L | Final Acid [SO$_4$] / {K} M / mg/L |
|---|---|---|---|---|---|---|
| 484-2 | 15 / 0.528 / -- | 21 / 0.332 / 1.7 | 1 / 0 / 0 | 133 / 2.28 / 0.0038 | 0.5 / 11 | 1.0 / 127 |
| 484-6 | 9 / 0.750 / 7.5 | 13 / 0.542 / 2.4 | 2 / 0 / 0 | 49 / 2.54 / 0.0011 | 0.5 / 11 | 1.1 / 159 |
| 484-22 | 5.5 / 0.698 / 8.5 | 3.2 / 0.485 / 1.8 | 0 / 0 / 0 | 20 / 2.62 / 0.0011 | 0.582 / 11 | 1.35 / 1237 |
| 484-27 | 3.6 / 0.635 / 7.5 | 1.9 / 0.375 / 1.4 | 0 / 0 / 0 | 20 / 3.55 / 0.0016 | 0.472 / 11 | 1.33 / 1084 |
| 484-31 | 511 / 0.602 / 10.3 | 403 / 0.527 / 2.0 | 0 / 0 / 0 | 349 / 1.23 / 0.0021 | 0.486 / 11 | 0.665 / 783 |

FIG. 7

Summary KOH Electrolysis

| Run # | CD/V mA/cm² / V | Charge Passed F | Unit Anolyte [OH]* M | Unit Catholyte [OH] M | Final Catholyte [OH] M / % | Cathodic CE % | K:Na mole Ratio in Anolyte | K:Na mole Ratio Transported across Membrane | Partition Coefficient For K vs Na |
|---|---|---|---|---|---|---|---|---|---|
| 484-41 | 200 / 4.6 | 2.75 | 2.54 | 0.1 | 4.37 / 20.4 | 98.6 | 1544:1 | 6273:1 | 4.1 |
| 484-15 | 340 / 5.6 | 2.48 | 2.52 | 4.05 | 7.45 / 32.0 | 98.7 | 1617:1 | 5457:1 | 3.4 |

FIG. 8

Summary of Analytical Results for Electrolysis Runs

| RUN # | Initial Anolyte [OH] / [Na] M / mg/L | Final Anolyte [OH] / [Na] M / mg/L | Initial Catholyte [OH] / [Na] M / mg/L | Final Catholyte [OH] / [Na] M / mg/L |
|---|---|---|---|---|
| 484-11 | 2.54 / 29 | 1.18 / 25.3 | 0 / 0 | 4.37 / 16 |
| 484-15 | 2.52 / 29.4 | 1.38 / 25.8 | 4.05 / 19.4 | 7.45 / 33.6 |

SYSTEM AND METHOD FOR PRODUCING HIGH PURITY COLLOIDAL SILICA AND POTASSIUM HYDROXIDE

The invention relates generally to the fields of ion exchange, ultrafiltration and electrodialysis and, more specifically, to the methods for utilizing ion exchange, ultrafiltration and electrodialysis to produce high purity colloidal silica and/or potassium hydroxide.

BACKGROUND OF THE INVENTION

Colloidal silica is a suspension of very small, spherical particles of amorphous (not crystalline) silica suspended in water. The material is colloidal in that the silica particles do not settle out of the solution. The silica particles generally range in size from about 8 nanometers to a (maximum size of about 300 nanometers, or, more, beyond which the silica ceases to be collidal and begins to settle out of solution. Colloidal silica has been used for a variety of purposes, including precision casting, as a lining for molds, as a frictionizing (non-skid) agent, and in a variety of medical and pharmaceutical uses such as toothpaste, dental castings and drug delivery systems.

One relatively recent use which has arisen for colloidal silica is in the polishing of semiconductor materials, such as the silicon wafers used in computer chips, by a process known as Chemical Mechanical Planarization (CMP). CMP involves the polishing of semiconductors and chips using very small abrasive particles of silica alumina, ceria or other materials in a slurry or suspension with a chemically active carrier solution. Colloidal silica has also recently come into use in polishing other items such as hard disk drives, electronic memory devices and raw silicon oxide wafers to accomplish the rough polishing of chips prior to CMP.

The electrical performance of finished semiconductor chips can easily be affected by contaminants to which the semiconductor wafers are exposed during processing. Such contamination can be in the form of discrete particles and water soluble or dispersed organic and inorganic impurities. In particular, the use of silica sols that are contaminated with trace transition metals, alkali and alkaline earth metals, aluminum, and other metals causes difficulties when used in wafer polishing. Sodium, potassium, alkali and alkaline earth metals such as calcium, magnesium, and transition metals such as iron, copper, manganese, nickel, and zinc are particularly troublesome. In general, any transition metal from groups IB, IIB, IIIB, IVB, VB, VIB, and group VIII of the Periodic Table of Elements, if present in high enough concentrations, can cause difficulties in the final products manufactured with silica sols containing these contaminants.

An additional problem of metal contaminants is that many of these substances have much higher diffusivities in both silicon and silicon dioxide than do the more conventional dopants, such as phosphorus and boron. As a result unpredictable electrical properties can result when silicon wafers are contaminated with these metals. For example, alkali metals such as lithium, sodium, and potassium cause shifts in electrical properties (threshold and flat-band voltages) when incorporated into semiconductor devices.

Currently used colloidal silica CMP slurries generally include a relatively high amount of contaminating sodium, which is very difficult to remove. The contaminating sodium causes defects in the chips in the later manufacturing processes. Accordingly, there is a need for an improved method for producing very low sodium content colloidal silica for use in these applications. There is also a need for an improved method of producing high purity potassium hydroxide which is also an additive used in some CMP slurries.

One method which has been developed in an attempt to produce a low sodium potassium stabilized silica sol is disclosed in U.S. Pat. No. 4,915,870 to Jones. The method disclosed by Jones uses an acid sol process to produce a silica sol having a sodium concentration of less than 150 ppm using commercially available KOH to stabilize the pH of the sol. However, while the method disclosed by Jones is suitable for producing silica sols having a sodium concentration of less than 150 ppm, it would be preferable to produce silica sols having much lower sodium concentrations for use in electronics applications.

One method of producing a colloidal silica sol having a substantially uniform particle size is disclosed in U.S. Pat. No. 3,789,009 to Irani. The sols are produced by adding simultaneously an alkali metal silicate and a cation exchange resin to a heel of water containing preformed colloidal silica particles at a pH within the range of 8–11, at a temperature of 60–150 degrees Celsius, and at a rate below that at which nucleation occurs. The cation exchange resin is added to the heel to remove the alkali metal cations from the alkali metal silicate causing the silicic acid to polymerize onto the heel nuclei to form large silica sols. Since the polymerization rate is similar for all of the uniform seed particles, the resulting larger sols also have a relatively uniform size distribution. By controlling the amount of alkali metal silicate and resin added it is possible to produce colloidal silica particles having a uniform size of between 8 nm and 200 nm. In this process, preferably the silicic acid concentration is maintained below the nucleation point to avoid the formation silica particles not sharing in the uniform size. Other processes to produce such sols are well known in the art.

Therefore, it is an object of the present invention to provide a system and method for producing very low sodium colloidal silica suitable for use in electronic applications.

It is another object of the present invention to provide a process for producing colloidal silica particles having a uniform shape and size.

It is yet another object of the present invention to provide a method for producing very high purity potassium hydroxide for use in the CMP slurry, and other uses.

BRIEF DESCRIPTION OF THE INVENTION

The above objectives are accomplished according to the present invention by providing a system and method for producing high purity colloidal silica which includes the steps of providing a quantity of potassium silicate; subjecting the quantity of potassium silicate to an ion exchange process to remove a first portion of potassium therefrom to produce a quantity of colloidal silica; and subjecting the quantity of colloidal silica to ultrafiltration to remove a portion of sodium therefrom, producing a quantity of high purity colloidal silica.

In a further preferred embodiment of the present invention, the ion exchange resin which has previously been utilized to remove potassium from the potassium silicate may be utilized in the production of high purity potassium salts. To produce a very low sodium, high purity potassium salt, the ion exchange resin may be regenerated by contacting it with an acid to produce a quantity of potassium salt, which may be further purified by evaporation, crystallization and/or ultrafiltration. The low-sodium potassium salt produced is further processed by electrodialysis and/or electrolysis in order to produce a low-sodium potassium hydroxide, suitable for re-addition to the low-sodium colloidal silica to produce a very low sodium potassium hydroxide stabilized CMP silica slurry.

Other objects, aspects, and advantages of the present invention will be apparent to those skilled in the art from a reading of the following detailed disclosure of the invention.

BRIEF DESCRIPTION OF THE FIGURES

The construction and design to carry out the invention will hereinafter be described together with other features thereof. The invention will be more readily understood from a reading of the following specification and by reference to the accompanying drawings forming a part thereof, wherein an example of the invention is shown and wherein:

FIG. 4 is a table summarizing data from KOH production experiments using electrodialysis.

FIG. 5 is a first table summarizing partition coefficient data from electrodialysis experiments.

FIG. 6 is a second table summarizing partition coefficient data from electrodialysis experiments.

FIG. 7 is a first table summarizing KOH production data from electrolysis experiments.

FIG. 8 is a first table summarizing KOH production data from electrolysis experiments.

DETAILED DESCRIPTION OF THE PREFERRED EMBODIMENT

Figure 1:
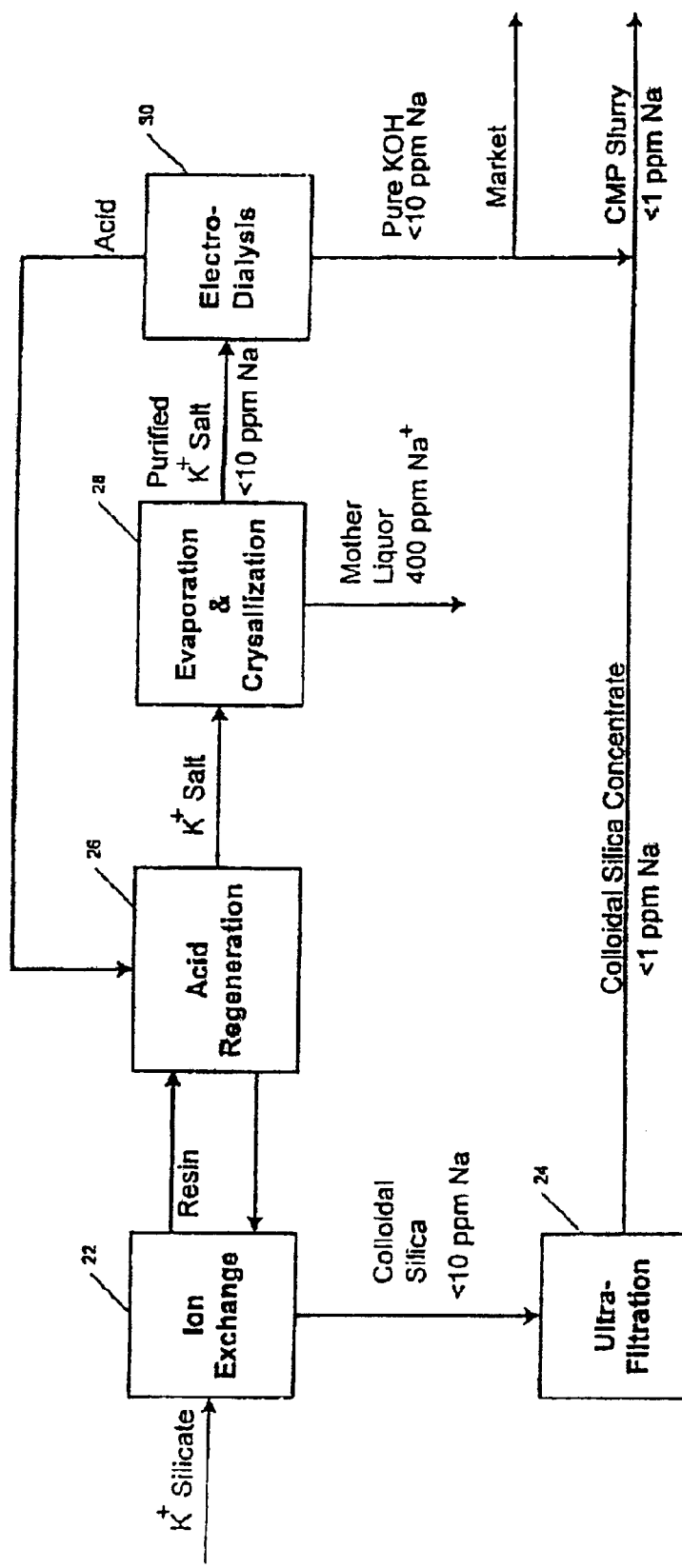
FIG. 1 is a block diagram illustrating a preferred embodiment of the method of the present invention.

Referring now in more detail to the drawings, the invention will now be described in detail. As shown in FIG. 1, a quantity of silicate salt is subjected to an ion exchange process in an ion exchange reactor 22 wherein the metallic cation is removed to produce a colloidal silica sol and a cation enriched ion exchange resin. The silica sol is then subjected to ultrafiltration in ultrafiltration device 24 removing residual traces of the metallic cation and concentrating the solids to produce a high purity colloidal silica sol. This silica sol is particularly suitable for use as a CMP slurry. The cation enriched resin is then regenerated by the addition of acid in regeneration chamber 26 to produce a salt of the metallic cation. The resulting metallic cation salt is purified, first by concentration in evaporator/crystallizer 28 followed by electrodialysis in electrodialysis cell 30 to produce a high purity metal hydroxide, preferably KOH, also suitable for sale on the open market for use in CMP slurries.

The formation of colloidal silica in the present invention is accomplished by subjecting a quantity of low-sodium silicate salt to an ion exchange process in an ion exchange reactor 22. In the preferred embodiment, the silicate salt used is a potassium silicate having a sodium concentration of less than 200 ppm and more preferably less than 100 ppm, though one of ordinary skill in the art should recognize than other silicate salts, such as lithium silicate, magnesium silicate, and calcium silicate may also be suitable. A potassium silicate having less than 100 ppm sodium which has proven suitable is Zacsil E-200 from Zaclon, Inc. of Cleveland, Ohio. Because the initial silica salt used has a low sodium level, the resultant colloidal silica products also have a very low level of contaminating sodium in the range of 1–5 ppm. This sodium level may be further reduced by washing the colloidal silica with deionized water in an ultrafiltration device 24 while adding potassium hydroxide to maintain the pH and cation concentration. The resulting product is a colloidal silica sol, based in potassium hydroxide which includes less than 1 ppm contaminating sodium, a purity much higher than is obtainable by conventional processes.

The silica sols are then concentrated by either evaporation or, more preferably, ultrafiltration to recover an aqueous colloidal silica sol containing 5%–55% by weight $SiO_2$ and having a pH of between 8 and 10.5. In the preferred embodiment ultrafiltration is used to wash out contaminating sodium by replacing the aqueous solution with deionized or distilled water while simultaneously adding a small amount of ultrapure potassium hydroxide to maintain the pH. Ultrafiltration is also useful to concentrate the colloidal silica sol to a desired concentration. The resulting colloidal silica sol also optimally has a sodium concentration of less than 10 ppm sodium, but more preferably, less than 1 ppm sodium. The silica sols generally have an average particle size of 8–200 nm and preferably of from 10–80 nm and a particle size distribution with coefficient of dispersion of 0.16–0.5 and preferably 0.16 to 0.25. These sols exhibit long-term stability.

When using potassium silicate as the silicate salt, the colloidal silica process produces a waste stream of potassium salt upon acid regeneration of the ion exchange resin in regeneration chamber 26. The potassium salt waste stream is useful as a source from which high purity potassium salts may be generated. In the presently preferred colloidal silica process described above, the acid used is sulfuric acid and the waste stream has a potassium sulfate concentration of approximately 5–10%. The following example, for example and not limitation, will be directed to use of potassium sulfate. Hydrochloric acid may also be used, however, the resulting chloride contamination can create problems if the potassium products are intended to be used in the semiconductor industry. Nitric and phosphoric acids are also acceptable.

As shown in FIG. 1, to purify the potassium sulfate stream, the potassium sulfate waste is first directed to an evaporator/crystallizer 28. Evaporator/crystallizer 28 concentrates the potassium sulfate under conditions wherein potassium sulfate is only marginally soluble and, thus, preferentially crystallizes. Next, the resulting potassium sulfate crystals are redissolved in deionized water and fed into an electrodialysis cell 30 wherein the sulfate is dialyzed out to create a very pure but weak solution of potassium hydroxide. Alternatively, the potassium sulfate solution may be separated by electrolysis. The resulting potassium hydroxide solution may then be concentrated by evaporation to produce a commercial grade ultrapure potassium hydroxide which is suitable for use in electronic applications. Currently, electronic applications require potassium hydroxide having less than ~100 ppm to 200 ppm of contaminating sodium, whereas the current process is intended to produce potassium hydroxide having less than 100 ppm contaminating sodium, but more preferably less than 10 ppm.

In the preferred embodiment, electrodialysis (ED) is used to split the potassium sulfate and produce potassium hydroxide by using a three compartment cell incorporating bipolar membrane technology. In this process, the potassium sulfate stream is circulated through the middle compartment of the cell. Due to the potential field, potassium ions are transported across the cation exchange membrane and sulfate ions are transported across the anion exchange membrane. The potassium ions then combine with hydroxide ions formed by the dissociation of water at the cathodic surface of the bipolar membrane, and the sulfate ions combine with protons formed by dissociation of water at the anodic surface of the bipolar membrane. The net result is a depletion of the potassium sulfate stream in the middle compartment and the generation of separate sulfuric acid and potassium hydroxide streams in the two adjacent compartments.

In an alternative embodiment, the potassium sulfate may be split by subjecting the KOH solution to electrolysis in a standard two compartment cell to produce electronics grade KOH. The dialysis is achieved by circulating KOH on both sides of the cell and separated by a NAFION® membrane.

On the anode side of the cell oxygen gas and protons are produced. On the cathode side, hydrogen gas and hydroxyl ions are the products. The hydroxyl ions would combine with the potassium ions that cross the membrane to produce KOH. The membrane preferentially transports potassium over sodium because the concentration of potassium is much higher than that of sodium and also because the partition coefficient of potassium into NAFION® is about three to four times that of sodium. The net result is a concentrated KOH solution with very low sodium concentration.

This low-sodium KOH produced according to the above method is suitable for addition to the low sodium colloidal silica previously described to produce a KOH stabilized CMP silica slurry suitable for use in semiconductor applications. In general, the electronics industry currently prefers to use CMP silica stabilized with KOH to a pH of 10–11, which requires addition of approximately 0.2–0.5% KOH. Electronics grade KOH has approximately 200 ppm contaminating sodium. Accordingly, if electronics grade KOH is used, the use of electronics grade KOH will result in a final CMP silica having greater than 1.0 ppm contaminating sodium. By using the very low sodium KOH of the present invention, the final sodium level of the KOH stabilized colloidal silica can be kept below 1.0 ppm, which is much more suitable for use in semiconductor applications.

Experimental Procedure

Silica Sol Synthesis

EXAMPLE 1

A colloidal silica sol was produced generally in accordance with the methods outlined in U.S. Pat. No. 2,631,134 to Iler et al. Approximately 3 liters of Purolite C-106 cation exchange resin in the hydrogen form was suspended in 10 liters of deionized water in an agitated 5 gallon vessel and heated to 95 degrees Celsius. To this was rapidly added a volume of ZACSIL® E200 potassium silicate sufficient to deplete the ion-exchange resin, ending up with a final pH of 8.93. In this instance, 3,950 grams of the potassium silicate solution were required. The resulting colloidal suspension had an average particle size of 10,95 nanometers in diameter and a ratio of $SiO_2$ to $K_2O$ of 38.

A portion of this material was then further treated with the same type of potassium silicate and ion-exchange resin according to the method taught by U.S. Pat. No. 3,789,009 to Irani. The purpose of this process is to increase the particle sizes of the silica through accretion of active silica onto a heel of smaller particles, or nuclei. In this fashion, the particles can be "grown" to 300 nanometers, or more, if desired. Twenty-five (25) gallons of material with an average particle size of 70 nanometers was produced. At this point, the material contained approximately 10% silica solids by weight.

The dilute sol was then concentrated, using an ultrafiltration unit, as is well known in the industry. In this fashion, the material was concentrated to approximately 35% $SiO_2$. When measured by atomic absorption, this suspension had a total sodium content of 83 parts per million. This included sodium in the carrier solution as well as any which may have been occluded within or adsorbed upon the silica particles themselves.

The ultrafiltration unit has the further desirable characteristic of removing dissolved species, such as salts along with the water in the permeate. This principle may be used to effect a process commonly referred to as diafiltration, or the dilution and removal of impurities through filtration. Once the material had been concentrated, five gallons of deionized water were added and the ultrafiltration continued in order to dilute and remove the sodium impurities. Once five gallons more permeate had been removed, which took 15–20 minutes, five more gallons of deionized water was added. This process was repeated until 50 gallons of water had been added to the suspension and 50 gallons of additional permeate had been removed. The pH of the suspension was maintained between 9 and 10 using commercially available reagent grade potassium hydroxide. When measured by atomic absorption, this suspension had a total sodium content of 0.6 parts per million in a product with a final concentration of 30% silica.

Reagent grade potassium hydroxide with a sodium content of approximately 100 ppm was added to the suspension for stability. The resultant slurrry, suitable for use in CMP, had a total sodium content of 2.2 ppm. It is estimated that, with potassium hydroxide produced as described herein, the total sodium content would not exceed 1.0 ppm.

EXAMPLE 2

The initial sol from example one above was used to produce a sol with an average particle size of 130 nanometers in diameter. As before, the accretion process taught by U.S. Pat. No. 3,789,009 to Irani was used to effect the particle growth.

The same process of ultrafiltration/diafiltration described in example one was used to concentrate the suspension and to dilute and remove dissolved impurities. In this case, the process started with 30 gallons of dilute sol, concentrated to about 35% solids. At this point, the sodium content was measured by AA to be 12.9 ppm. Sixty (60) gallons of diluting water was used, as described in example one, five gallons at a time. The final solution was measured at 1.2 ppm sodium content. When the reagent grade potassium hydroxide was added, the resultant 30% $SiO_2$ product contained 2.2 ppm sodium.

EXAMPLE 3

A solution of 5% sulfuric acid was used throughout the experimental proceedings to regenerate the ion-exchange resin. During the regeneration process, the acid strips the potassium out of the resin. The result is a solution containing approximately 5–10% potassium sulfate at a pH of about 3–4. This potassium sulfate solution was collected after each regeneration and brought up to pH 7 using reagent grade potassium hydroxide. A total of 55 gallons was collected with an average potassium sulfate concentration of 7.0% by weight.

This material was concentrated to the point of crystallization using three four-liter open beakers. After cooling to room temperature, the crystals of potassium sulfate were separated from the mother liquor using a buchner funnel. The crystals were rinsed once with deionzed water. The rinsate was collected and added to the mother liquor. It is estimated that approximately 50% of the potassium sulfate ended up as solid crystal and 50% was retained in the mother liquor.

A representative sample of the crystal was dissolved in deionized water to form a saturated solution at room temperature. The sodium content of both this solution and the mother liquor was measured using atomic absorption. The mother liquor had a sodium level of approximately 400 ppm. The solution made from dissolved crystal had a sodium content of approximately 8 ppm.

Both of these sources of potassium sulfate were sent to the Electrosynthesis Company of Lancaster, N.Y. to perform the electro-dialysis experiments.

Electrodialysis

Figure 2:
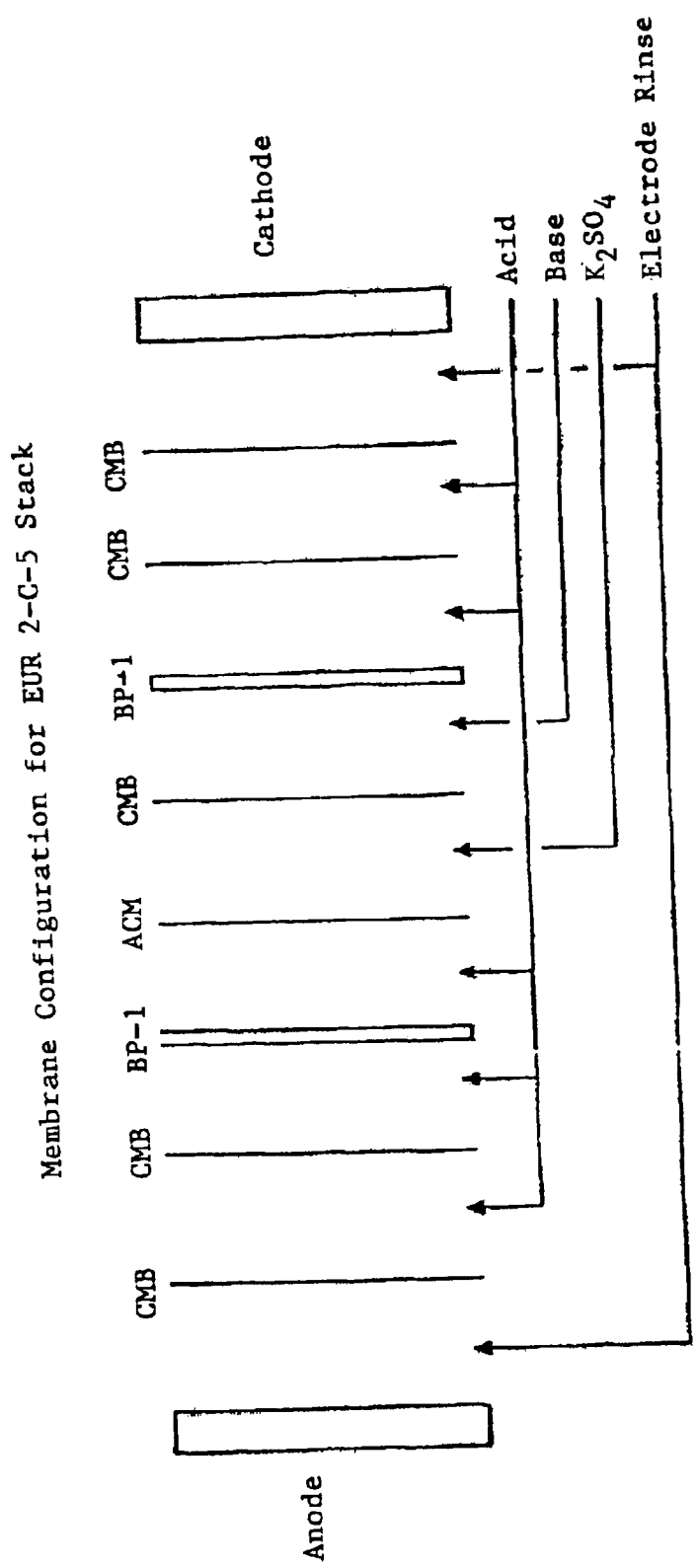
FIG. 2 is a block diagram illustrating the membrane configuration used in a first set of electrodialysis experiments.
Figure 3:
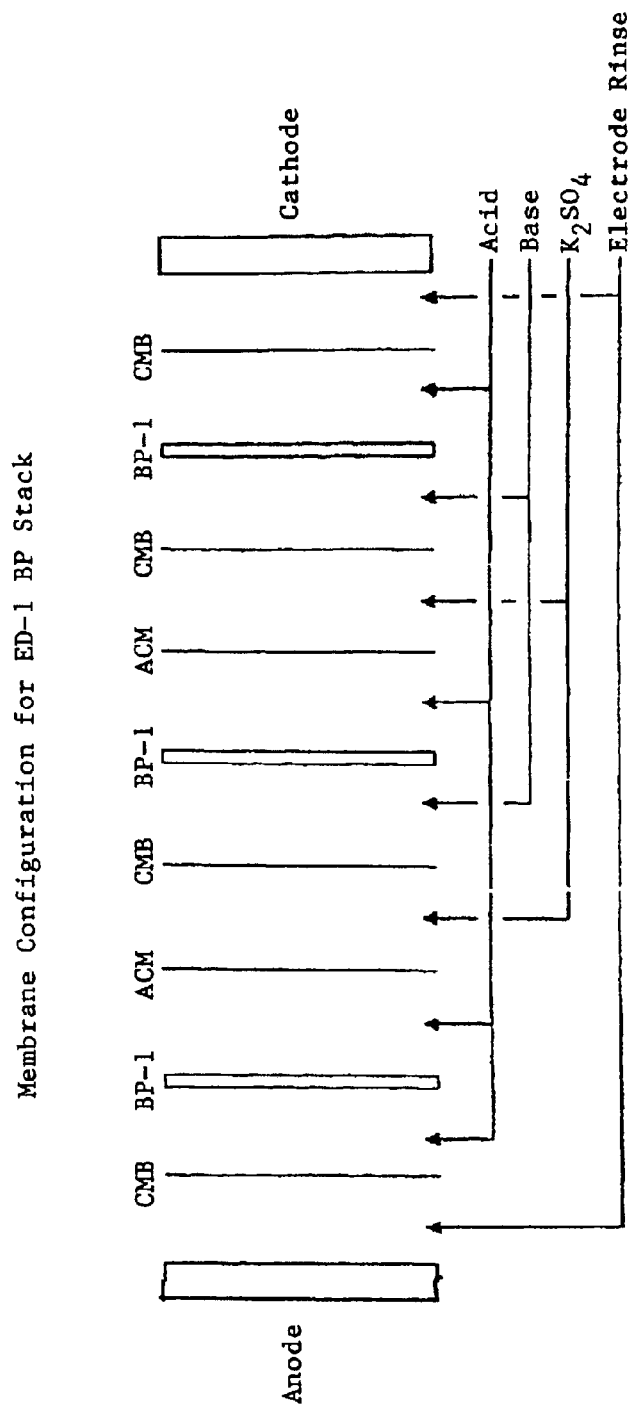
FIG. 3 is a block diagram illustrating the membrane configuration used in a second set of electrodialysis experiments.

Electrodialysis experiments were conducted in two separate electrodialysis cells. In the first set of experiments, a Eurodia EUR 2-C-5 stack was used. The stack had a platinized titanium anode and stainless steel cathode. The gaskets were made of an ethylene-propylene terpolymer (EPDM). The effective unit surface area in this stack is 0.2 m². Neosepta ACM anion exchange membranes, CMB cation exchange membranes and BP-1 bipolar membranes were utilized and were arranged as shown in FIG. 2, In the second set of electrodialyis experiments, an Electrosynthesis ED-I-BP stack was used. This stack also had a platinized titanium anode and stainless steel cathode. The effective unit surface area of this stack is 0.01 m². The membranes used in this stack were the same as used in the Eurodia stack and were arranged as shown in FIG. 3. Most components of the stack (frames, gaskets and bipolar membranes) were soaked in a dilute KOH solution prepared from reagent grade pellets for several hours before the stack was built.

The electrodialysis setup consisted of a 3.5 L polyethylene feed reservoir, a 1 L PTFE base reservoir, and 2 L glass reservoirs for both electrode rinse and acid streams. Dilute KOH solution was circulated through the base loop for several hours to remove any traces of contamination before the commencement of the experiments. The flow rate and stack inlet pressure of the feed loop was monitored during the run. The pressures on the other loops were set equal to that of the feed loop. All experiments were run at a constant current with the current gradually ramped up to the target current and left there for the duration of the experiment. Power was supplied by a Sorenson #DCS 20–50 power supply and total charge measured using an ESC #640 coulometer.

The electrodialysis experiments were conducted in an Electro MP cell (Electrocell AB, Sweden) equipped with nickel electrodes and a NAFION® 450 cation exchange membrane. This membrane is composed of a 3200 equivalent weight polymer and is typically used for KOH production. Power was supplied by a XANTREX® #XFR12~100 power supply. All components of the cell (PVDF frames, EPDM gaskets, membrane) were soaked in dilute KOH solution prepared from reagent grade pellets for several hours before the cell was built. In addition, dilute KOH was circulated through both sides of the cell for several hours to remove any traces of contamination. Both anolyte and catholyte reservoirs were HDPE and were connected to the cell via TEFLON® tubing. The starting anolyte solution was prepared from reagent grade KOH pellets.

Initial and final samples of the acid, base, and feed streams from the electrodialysis experiments were stored in polyethylene bottles. Selected samples were analyzed for sulfate by ion chromatography, potassium and sodium content by atomic absorption, and acidity or alkalinity by acid/base titration. Samples collected from the electrodialysis experiments were also stored in polyethylene bottles and analyzed for sodium content by atomic absorption and alkalinity by acid/base titration.

A typical ED experiment was conducted as follows; 3.5 liters of a saturated solution was first prepared by dissolving $K_2SO_4$ crystals into deionized water. The resultant solution was then filtered through a 5 micron MILLIPORE® filter before being introduced into the feed reservoir. When the high sodium saturated solution was used, it, too, was filtered through a 5 micron filter prior to use. The initial base consisted of 500 ml deionized water. The initial acid solution and electrode rinse both consisted of one liter of nominally 0.5M sulfuric acid. The electrode rinse was reused for subsequent experiments.

After introduction of the solutions into their respective reservoirs, the circulating pumps were turned on. After several minutes of circulation, the base compartment was sampled and then the power supply started. The current was slowly ramped up to the target current. In most cases, enough charge was passed to theoretically reduce the feed concentration by 50%. At the end of the experiments the current was turned off, the solutions drained and their volumes measured. Measured volumes of water rinses were then introduced into the acid and base compartments of circulated for several minutes before being drained and analyzed. From this analysis, the dead volumes in the compartments were calculated and added to the total volumes before calculating efficiencies etc. All samples were then analyzed as described previously. Prior to starting the next experiment, the feed, acid, and base compartments were rinsed several times with deionized water.

The electrolysis experiments were conducted as follows: The starting anolyte for the first experiment was 2.5M KOH prepared from regent grade pellets. The starting catholyte was initially deionized water but this was changed to approx. 0.1M KOH when no current flowed at the maximum applied voltage. After the solutions were introduced into their respective reservoirs, the circulating pumps were turned on and after circulation for a few minutes, the catholyte was sampled. The power was then turned on and enough charge passed to reduce the anolyte alkalinity by about 50%. At the end of the run the cell was drained, the volumes measured and the anolyte and catholyte compartments rinsed with known amounts of deionized water for later calculation of dead volume. The second electrolysis experiment was similar with the exception that the starting catholyte was the end catholyte from the previous experiment.

The current efficiency for KOH production for all of the ED experiments (see FIG. 4) varied between 82% and 87%, with the main inefficiency being the back migration of hydroxyl ions across the cation exchange membrane. It is also possible that proton transport from the acidified feed compartment contributed to the inefficiency. The strength of KOH produced varied between 2.33M (11.6% w/w) and 3.55M (17.2% w/w).

The current efficiency for acid production averaged 78% for the two experiments with the Eurodia stack. The current efficiencies obtained with the ED-1BP stack started at 76% for the first experiment then dropped down to 50% for the third and final experiment. In all cases loss in current efficiency is due primarily to the back migration of proton from the acid compartment across the anion exchange membrane (the pH of the feed dropped in all experiments). It is also possible that part of the inefficiency is due to the diffusion of sulfuric acid molecules out of the acid compartment into the feed compartment. The initial efficiencies observed are consistent with what can be expected for this type of anion exchange membrane. The deterioration of the acid current efficiency should be evaluated over a longer time period before drawing any final conclusions; however, it is possible that the lower current efficiency (CE) in the last run is a result of using the mother liquor which may contain a higher level of impurities.

In four of the five runs conducted, sulfate concentrations detected in the KOH product varied between 1.1 mM (100 ppm) and 2.1 mM (200 ppm) corresponding to diffusion 5 coefficients of $1.9-2.8*10^{-12}$ m²/sec and an average of $2.4*10^{-12}$ m²/sec. One of the five runs had a relatively higher rate of diffusion (360 ppm and $6.0*10^{-12}$ m²/sec). This result may have been due to experimental error. Note that the level of transport is consistent with that normally seen for bipolar membranes.

The potassium detected in the sulfuric acid product for the runs in the Eurodia stack averaged 143 mg/l, corresponding to an average diffusion coefficient of $2.6*10^{-12}$ m²/sec. However, when the ED-1-BP stack was used, the potassium concentrations increased up to an average of 1035 mg/L corresponding to an average diffusion coefficient of $1.7*10^{-11}$ m²/sec. It is possible that this may have been caused by a slight crossflow leakage of solution.

The ratio of partition coefficients for K vs. Na is a measure of the membrane's preference for transporting one species over the other. Measurements of the average K:Na ratios in the feed and the final ratios in the KOH product indicated that they were very consistent for all three runs using the ED-1-BP stack and resulted in an average partition coefficient ratio of 0.93 for K vs. Na (FIG. 5 and FIG. 6), indicating that the membrane shows very little preference for either species. This is lower than found for NAFION® membranes but is very consistent with previous experience gained at Electrosynthesis Company (ESC). The results obtained when a $K_2SO_4$ solution with a high Na content was used (Run 484-31) are similar. This indicates that the ratio was independent of the relative concentrations of the two species.

Two electrolysis runs were performed, one at 200 $mA/cm^2$ and the other at 350 $mA/cm^2$. The results (see FIG. 7 and FIG. 8) showed that cathodic current efficiencies were consistently high at 98.6% and 98.7%, producing KOH at 4.37M (20.4%) and 7.45M (32%). In NAFION® membranes of 1200 equivalent weight polymer the K:Na coefficient ratio is 3.97:1.22 or 3.25 times that of sodium. Analysis of the anolyte and catholyte solutions before and after electrolysis showed that the ratio of K vs. Na increased significantly, indicating that a much purer product was formed, and resulting in an average partition coefficient ratio of 3.75 for K vs. Na into the NAFION® membrane.

Based on the partition coefficient ratios obtained for the electrodialysis and electrolysis experiments, it is possible to calculate the maximum concentration of Na impurity that must be present in the starting saturated $K_2SO_4$ solution. A calculated starting maximum Na concentration of 6.3 ppm Na in 0.7M (13.4%) $K_2SO_4$ must be achieved in order to produce a 9.27M (40% w/w) solution of KOH with a maximum of 10 ppm Na impurity. This level was achieved in saturated solutions prepared from crystals supplied by Chemical Products Corporation (CPC).

It should also be noted that in the final electrodialysis experiment conducted with 5 solution made from crystal, we were able to produce a KOH solution of sufficient purity required for further electrolysis to produce 9.27M (40% w/w) KOH as specified above. These experiments demonstrate that potassium sulfate solutions can be split into sulfuric acid and potassium hydroxide by electrodialysis using a three compartment cell incorporating bipolar membrane technology. KOH solutions of up to 3.55M(17.2% w/w) can be produced with very good current efficiency (86%) and low sulfate contamination of 1.6M (133 ppm) at peak operating current densities of up to 200 $mA/cm^2$.

There was virtually no preference for transport of potassium vs sodium across the NEOSEPTA® CMB cation exchange membrane. The ratio of K vs. Na in the feed was very similar to that found in the KOH product. The average partition coefficient ratio for K vs. Na was 0.93:1. This is consistent with previous experience gained at ESC. Sulfuric acid at concentrations of up to 1.3 5M can be produced at current efficient of 76%. With regard to the electrolysis of reagent grade dilute KOH solutions to produce high purity KOH, NAFION® membranes demonstrate a definite preference for the transport of potassium vs. sodium. In the experiments performed, up to 7.5M (32% w/w) KOH was made at very high efficiency of 98.7% and significantly increased purity. The average partition coefficient ratio of K vs. Na was 3.75:1.

Using the ratios of partition coefficients obtained during our electrodialysis and electrolysis experiments, we calculate that in order to achieve a final 9.27M (40% w/w) product with 10 ppm Na contamination, a starting saturated $K_2SO_4$ solution of 0.7M (13.4%) must contain 6.3 ppm or less of Na.

It, thus, will be appreciated that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method for producing high purity colloidal silica and a high purity potassium hydroxide, said method comprising the steps of:

providing a quantity of potassium silicate;

subjecting said quantity of potassium silicate to a cation exchange process to remove a first portion of potassium therefrom to produce a quantity of colloidal silica and a potassium enriched ion exchange resin;

washing said quantity of colloidal silica with water in an ultrafiltration device to produce a quantity of high purity colloidal silica;

regenerating said potassium rich ion exchange resin with an acid to produce a potassium salt solution;

subjecting said potassium salt solution to evaporation and crystallization to remove sodium therefrom to produce a quantity of high purity potassium salt solution;

subjecting said quantity of high purity potassium salt solution to electrodialysis and/or electrolysis to produce a high purity solution of potassium hydroxide; and adding a portion of said high purity potassium hydroxide solution while washing said quantity of colloidal silica to produce a high purity colloidal silica, suitable for use in the manufacture of CMP slurries.

2. The method of claim 1, wherein said colloidal silica has a sodium concentration of less than about 10 ppm.

3. The method of claim 1, wherein said high purity colloidal silica has a sodium concentration of less than about 1 ppm.

4. The method of claim 1, wherein said high purity potassium hydroxide solution has a sodium concentration of less than about 100 ppm.

5. The method of claim 1, wherein said high purity potassium hydroxide solution has a sodium concentration of less than about 10 ppm.

* * * * *